Oct. 31, 1944.　　K. L. TATE ET AL　　2,361,885
REGULATOR
Filed July 31, 1940　　6 Sheets-Sheet 3

INVENTOR.
KENNETH L. TATE
WILLIAM H. VOGT
BY RALPH E. CLARRIDGE
ATTORNEY.

Oct. 31, 1944.                K. L. TATE ET AL                2,361,885
                                  REGULATOR
                            Filed July 31, 1940           6 Sheets-Sheet 5

INVENTOR.
KENNETH L. TATE
BY WILLIAM H. VOGT
RALPH E. CLARRIDGE
D. Clyde Jones
ATTORNEY.

Oct. 31, 1944.　　　K. L. TATE ET AL　　　2,361,885
REGULATOR
Filed July 31, 1940　　　6 Sheets-Sheet 6

INVENTOR.
KENNETH L. TATE
WILLIAM H. VOGT
BY RALPH E. CLARRIDGE
D. Clyde Jones ATTORNEY.

Patented Oct. 31, 1944

2,361,885

UNITED STATES PATENT OFFICE 2,361,885

REGULATOR

Kenneth L. Tate, William H. Vogt, and Ralph E. Clarridge, Rochester, N. Y., assignors to Taylor Instrument Companies, Rochester, N. Y., a corporation of New York Application July 31, 1940, Serial No. 349,024

8 Claims. (Cl. 236—86)

This invention relates to regulating or controlling systems and to instruments for use therein.

It will be appreciated that where a sudden deviation of a given magnitude takes place in a condition being regulated by a control system a larger correcting action should be effected than in the case of a slow deviation of like magnitude, if the system is to maintain the condition with minimum variation from the desired value. In accordance with one of the main features of the invention, the present system is arranged to effect its correcting action proportionally to the magnitude of deviation in a condition being controlled and also proportionally to the rate of said deviation.

In the use of such controlling systems, so many different variables are encountered in different processes that an arrangement which is adequate for one type of process may be seriously inadequate for another type. The present invention therefore has for another of its main features the provision of a regulating apparatus comprising unit construction in which various units may be simply added, readjusted or removed to satisfy the various process requirements encountered.

Another feature of the invention relates to a baffle and nozzle arrangement, wherein the baffle comprises a cylindrical or endless surface whereby the cooperating face of the nozzle is always substantially tangent to said surface under normal operating conditions, thereby obviating the need for an objectionable differential lever.

A further feature of the invention relates to a novel construction of follow-up unit which is easily calibrated.

Still another feature of the invention relates to a novel arrangement including an adjustable parallelogram linkage for causing a given motion of the follow-up unit to effect a corresponding motion of any desired magnitude within the range of adjustment.

Still a further feature of the invention relates to the arrangement of instrument parts whereby a new tube system may be substituted for an old one and the instrument can then be easily and accurately calibrated.

The other features and advantages of the invention will appear from the detailed description and claims when taken with the drawings in which Figs. 6 and 7 are fragmentary views showing especialy the arrangement for effecting adjustment of the pen arm and baffle assembly unit; Figs. 8 and 9 illustrate the arrangement for connecting the pen arm bracket to the connecting link, Fig. 9 being a section taken on the line 9—9 of Fig. 8; Fig. 10 shows an arrangement for latching together the set pointer gear and the disc of the baffle assembly unit; Fig. 11 is a front view of the set pointer gear and Fig. 12 a front view of the disc; Figs. 18 and 19 are respectively a front view and a plan view of a multiple pen mounting and multiple baffle assembly unit.

Figure 1:
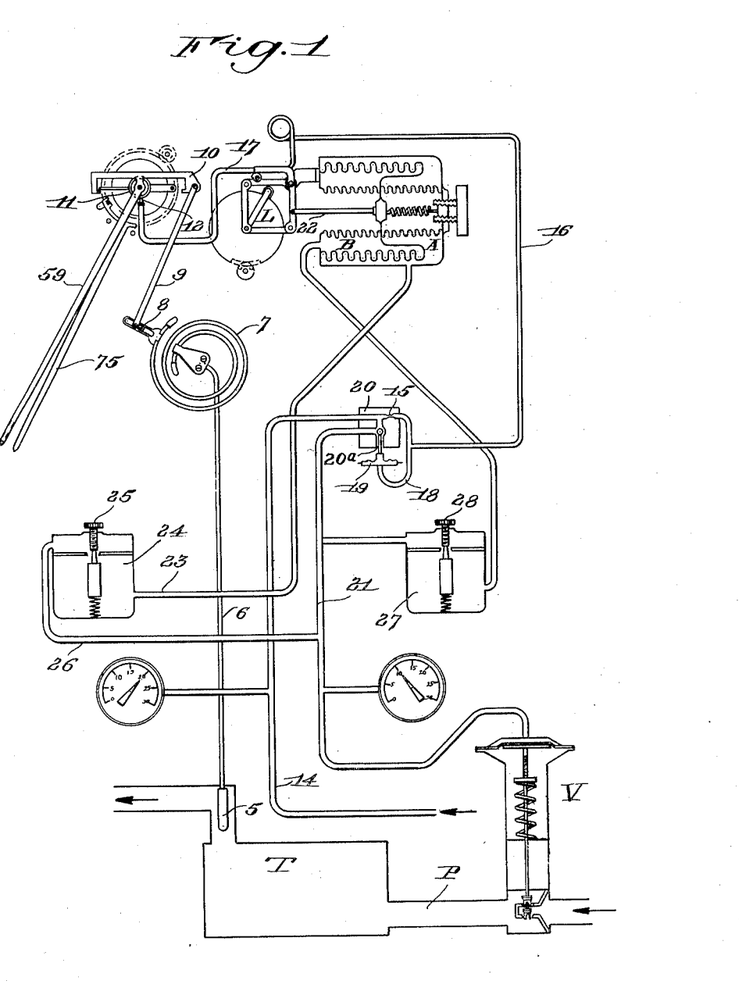
Fig. 1 is a diagrammatic showing of the regulating system of the present invention.

While this invention relates to a regulating instrument for controlling various conditions such as temperature, pressure, rate of flow, liquid level and the like, for convenience in description, the instrument has been illustrated diagrammatically in Fig. 1 in a temperature regulating system. However it should be understood that the invention is not limited to this specific purpose.

In the arrangement of Fig. 1 there is provided a tank T containing material, the temperature of which is to be accurately maintained at a given value. A temperature regulating medium such as steam, is introduced into this tank through a pipe P, under the control of a diaphragm motor valve V. In order to sense variations in the temperature of the material in the tank so that the valve V can be positioned to govern the flow of the temperature-correcting medium to the tank T, there is provided a thermosensitive tube system comprising a bulb 5 communicating through a capillary tube 6 with a hollow spiral Bourdon spring 7. The tube system, the bulb of which projects into the material in the tank, is filled with a thermosensitive fluid such as mercury, or a vaporizable liquid and its vapor.

The inner end of the Bourdon spring 7 is fixedly mounted while its outer or free end is provided with a take-off 8. This take-off is connected by a link 9 to means 10 which operates to move a baffle 11 with respect to the nozzle 12, the direction of baffle movement being dependent on the direction of temperature deviation. The nozzle 12 is supplied with compressed air from the supply conduit 14, through a constriction 15, conduit 16 and nozzle pipe 17 terminating in the nozzle. The conduit 16 also communicates through the branch conduit 18 with the capsular chamber 19 of a relay valve 20. In this way, as the baffle 11 approaches or recedes from the nozzle 12, air pressure in the nozzle pipe 17, conduits 16 and 18 and the capsular chamber 19 will build up or be reduced respectively. Thus when the pressure in the nozzle pipe 17 and in the chamber 19 increases, the relay air valve 20 will tend to close and thereby reduce or cut off the flow of compressed air from the supply conduit 14 to conduit 21 leading to the diaphragm motor top of the valve V, permitting the air in motor V to leak out of relay valve 20 by way of constricted port 20A allowing valve V to open. Conversely, when the pressure in the nozzle pipe 17 and the chamber 19 decreases, the relay air valve 20 will tend to open, increasing the flow of compressed air to the motor top of valve V so that this valve tends to close. The portion of the system first described constitutes a high sensitivity controller which satisfies all requirements of some types of installations.

In all control systems it is desirable to have a small temperature deviation (indicated by a small movement of pen arm 59) cause a large movement of the valve V, a condition commonly known as high sensitivity, as distinguished from a small movement of the valve V in response to a relatively large temperature deviation or pen movement, commonly referred to as low sensitivity. The highest tolerable sensitivity operation is desirable, since the instrument will then more accurately maintain the temperature at the desired value. However, if the instrument is adjusted to have too high a sensitivity with respect to the nature of the temperature deviations taking place in the system, the system will "hunt," that is, the valve V will tend to open wide on a small temperature drop and will not close until the predetermined temperature is exceeded. Then the valve will close and remain closed until the temperature in the system is below the given value. This cycle of valve operation with the control system oscillating about the desired temperature, is known as "hunting."

*Sensitivity reduction*

In order to adjust the regulator with respect to the different variables prevailing in different systems and thereby prevent hunting, it is frequently desirable to incorporate an arrangement for effecting sensitivity reduction so that the regulator can be adjusted for the highest sensitivity which can be tolerated without hunting. In the present arrangement, the sensitivity reduction is accomplished pneumatically and includes means which functions on a change of pressure in the conduit 21 to move the nozzle 17 in the same direction as the primary movement of the baffle 11. Thus when the Bourdon spring moves the baffle toward the nozzle 17, the sensitivity reducing means functions to move the nozzle away from the baffle slightly. On the other hand, when the baffle is moved away from the nozzle the sensitivity reducing means functions to move the nozzle toward the baffle thereby tending to reduce the correction that would otherwise be made in response to the primary change in the spacing between the baffle and the nozzle. This pneumatic sensitivity reducing means includes a follow-up unit having an expansible-walled air chamber A. The chamber operates a rod 22 which, in turn, actuates an adjustable parallelogram linkage L, to move the nozzle pipe 17 and the nozzle 12. Thus as the chamber respectively expands and contracts, rod 22 acting through the parallelogram linkage L, correspondingly moves the nozzle 12 with respect to the baffle so that the original spacing between the nozzle and the baffle due to the temperature deviation, is changed.

In the system of Fig. 1, the chamber A of the sensitivity reducing means communicates through a conduit 23, capacity 24, the adjustable needle valve 25 and the conduit 26, with the supply conduit 21 leading to the top of the motor valve V. However, in this portion of the description the needle valve 25 is considered as being wide open so that the capacity 24 and the needle valve have no more effect than if they were omitted from the connection and instead conduit 26 communicated directly with conduit 23. Then in this arrangement, when the baffle 11 recedes from the nozzle 12, the back pressure in the conduits 16 and 18, as well as in the branch conduit and capsular chamber 19, is reduced so that this chamber contracts. The contraction of capsular chamber 19 opens the relay valve 20, permitting an increased amount of compressed air to be supplied through conduit 21 to the valve V, tending to close it. However, the increased pressure in the conduit 21 is also communicated through the conduit 23 to the chamber A of the sensitivity reducing unit. The increased pressure in this chamber causes the bellows to carry the rod 22 toward the left as viewed in Fig. 1.

This movement is applied to the parallelogram linkage L which tends to move the nozzle 17 toward the baffle. In other words, the amount of primary separation between the baffle and the nozzle is reduced so that the amount of correcting action which takes place at the valve V, is less than that which would otherwise be effected. In a similar manner, when the baffle approaches the nozzle in response to a temperature deviation, the parts just described will function in the reverse sense to cause the nozzle to withdraw from the baffle a slight distance. An instrument of this type having adjustable sensitivity reduction satisfies all requirements in many systems in which a simple high sensitivity instrument is not fully satisfactory.

*Pre-act*

In certain cases where sudden temperature deviations take place, it is desirable to delay the action of this sensitivity reducing means so that the valve V will have a large initial correcting motion. To this end the mentioned capacity 24 and the adjustable needle valve 25 are included in the connection comprising conduits 23 and 26. In the absence of the capacity 24 and the continuously adjustable needle valve 25 or when needle valve 25 is wide open, the travel of the valve V is proportional to the movement of the pen arm, that is, proportional to the temperature deviation. However, when the capacity 24 and the adjustable needle valve 25 are connected as shown, the valve V is moved proportionally to the movement of the pen arm 59 and, in addition, is also moved proportionally to the velocity of the pen arm movement—a type of control herein referred to as "pre-act." By this arrangement the movement of the valve V is greater on rapid temperature deviations than it is on slow temperature deviations of equal magnitude. Thus in the case of a sudden temperature change, the valve V is moved to a position giving a large initial correcting effect before the pressure change through needle valve 25 and capacity 24 becomes effective, after which the valve movement is gradually reduced under the action of the sensitivity reducing unit when it begins to function so that the initial large correcting movement of the valve V is reduced.

Automatic reset with pre-act

The system disclosed in Fig. 1 also includes an arrangement referred to as "automatic reset," which maintains the controlled temperature at the bulb 5, within a narrow range, under all stable load conditions. This arrangement includes a second flexible walled chamber B arranged so that when compressed air is supplied thereto, it counteracts the effect of chamber A, and the instrument readjusts the valve V until the pressures in both chambers are equal. It will be noted that the chamber B is also connected with the conduit 21 which supplies compressed air to the motor top of valve V. This connection includes the capacity 27 and the continuously adjustable needle valve 28. It will be understood that the characteristics of the capacity 24 and needle valve 25 are such that the effect of a change in air pressure in conduit 21 is transmitted to chamber A more quickly than the effect of this change is transmitted to the chamber B, through capacity 27 and needle valve 28. With this automatic reset arrangement, when there is a change in temperature at bulb 5, for example a temperature rise, the baffle 11 rises. This increases the gap between baffle 11 and nozzle 12, thereby decreasing the back pressure in conduits 16 and 18 and capsular chamber 19. This falling pressure operates relay valve 20, increasing the pressure in conduit 21 and in the motor of diaphragm valve V. The increasing pressure in conduit 21 results in an increasing pressure differential across needle valve 25 and a gradually increasing flow of air through the valve 25. As the pressure in capacity 24, conduit 23 and chamber A rises due to the flow of air through valve 25, chamber A expands forcing the rod 22 toward the left in Fig. 1. This movement of the rod actuates the parallelogram linkage L in a direction to cause the nozzle to follow the baffle. Therefore, as long as the baffle rises due to increasing temperature, the nozzle will follow the baffle, but the gap between the nozzle and the baffle must necessarily be great enough to maintain a pressure differential across needle valve 25 of sufficient magnitude to produce the required flow of air through needle valve 25. Thus, if the temperature rises at a slow rate, the baffle rises at a slow rate, the nozzle will follow the baffle, but a relatively small pressure differential will be created across the needle valve 25, since a smaller air flow per unit of time is required through needle valve 25 to make the nozzle follow the baffle. However, if the temperature rises at a rapid rate, the baffle also rises at a rapid rate, the nozzle thus will follow the baffle but a relatively large pressure differential will be created across the needle valve 25, since a larger air flow per unit time is required through this needle valve to make the nozzle follow the baffle. Now if the opening of needle valve 25 is small, a greater pressure differential will be required across needle valve 25 to make the nozzle follow the baffle and therefore in this specific case, the pressure differential between conduit 21 and chamber A must be correspondingly high. If the opening of needle valve 25 is large, a lesser pressure differential will be required across needle valve 25 to make the nozzle follow the baffle and in this specific case the pressure differential between conduit 21 and chamber A will be low. Now if the needle valve 25 were wide open, there would be zero pressure differential across it, the nozzle would follow the baffle and the pressure change in conduit 21 would be a direct function of the temperature change. As the needle valve 25 is closed partially, a pressure differential is built up across it which is a function of the rate at which the temperature changes and as a result the pressure change in conduit 21 is a function of the rate of temperature change as well as the temperature change itself. Inasmuch as the pressure in conduit 21 communicates directly with the motor of the diaphragm valve V, the movement of the diaphragm valve itself and the resulting changes in flow through the valve become a function of both the temperature change and the rate of temperature change.

Now in the chosen case, the pressure in conduit 21 increased from its original value creating a pressure differential across needle valve 28 as well as across needle valve 25. This causes an air flow through needle valve 28 into capacity 27 and chamber B. As the pressure rises in chamber B, the effect of the increased pressure in chamber A is proportionally reduced and the gap between the baffle and nozzle gradually becomes larger. This results in a gradually increasing pressure in conduit 21 and the corresponding response at the diaphragm valve V. Now all of the above actions on conduit 21 and diaphragm valve V are in such a direction as to restore the temperature to its original value and it is apparent that an equilibrium in the system cannot be reached until the pressures in capacities A and B are equal (since they are interconnected via conduits and restrictions). Therefore the actions described above continue until equilibrium is established and the pressures in A and B are equal. This means that the nozzle 12 will have assumed virtually its original position and the baffle 11 will be at such a distance from it as to create the required output pressure in conduit 21. (This same pressure will exist in chambers A and B.) Therefore since the baffle has virtually returned to its original position, the temperature will have returned to its original value.

Automatic reset without pre-act

The arrangement just described can be modified to omit the pre-act function merely by fully opening needle valve 25 or by removing needle valve 25, together with capacity 24 and then connecting conduit 28 directly to conduit 23.

Description of the apparatus

Figure 2:
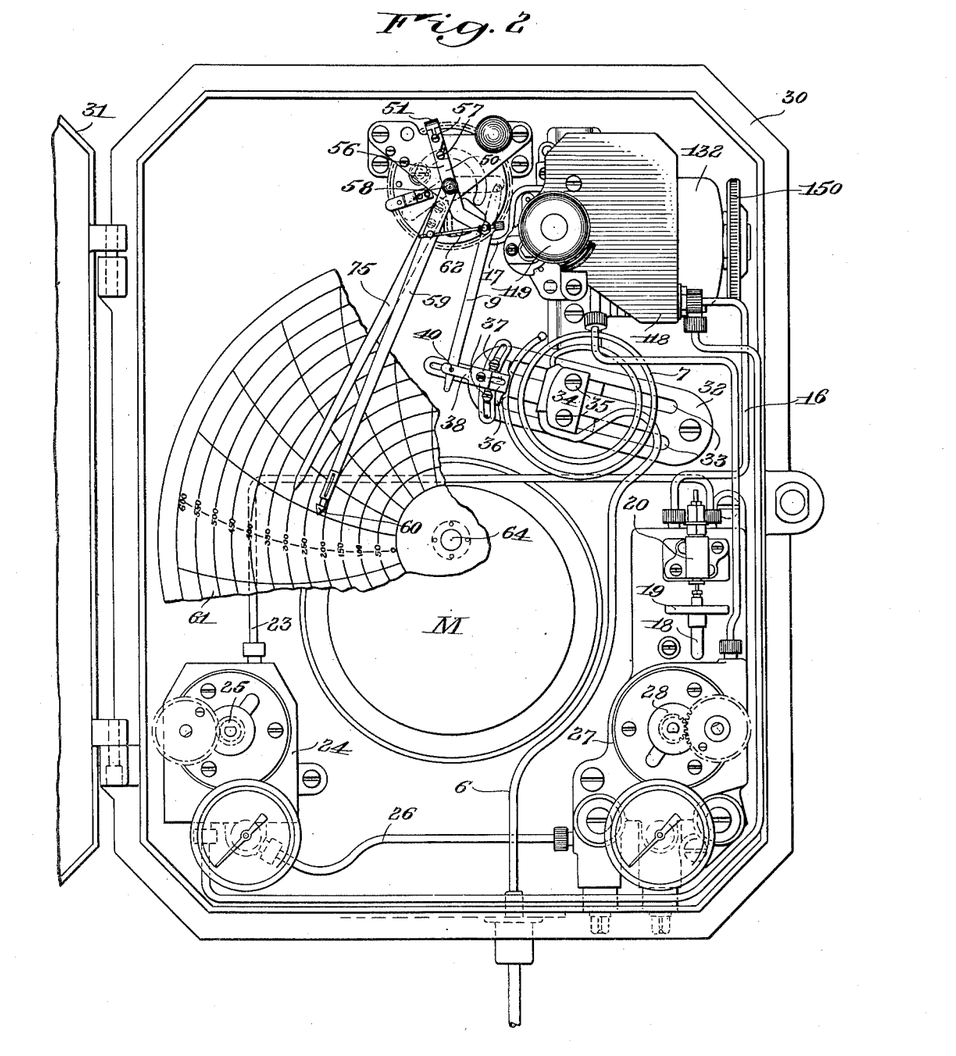
Fig. 2 is a fragmentary front view of a regulating instrument suitable for use in the system of Fig. 1.

With this brief description of the system incorporating the regulating instrument of the present invention, the construction and principle of operation of the instrument itself, will now be described. The instrument as shown in Fig. 2 includes a case 30, the front of which is closed by a door 31. On the inner rear wall of the instrument there is mounted the spiral Bourdon spring 7 of the temperature sensing means or tube system including the capillary tube 6 communicating with the bulb 5 located in the material, the temperature of which is to be controlled.

In accordance with one novel arrangement of the present invention, the mounting of the Bourdon spring comprises a sub-base 32 fixed on the inner rear wall of the case. This sub-base which is provided with a pair of spaced parallel slots 33 therein, is mounted so that these slots are inclined upwardly and to the left as viewed in Fig. 2. These guide slots 33 slidably receive portions of a clamping block 34 to which the inner end of the Bourdon spring 7 is fixed. It will be appreciated that by loosening the screws 35 in the clamping block, this block and the Bourdon spring carried thereby, can be adjusted along the slots in the sub-base and then locked in the adjusted position. It will be understood that this adjustable mounting of the Bourdon spring facilitates calibration of the instrument and enables a new tube system to be substituted into the instrument when there is need of replacing the original tube system. A lug 36 secured adjacent the free end of the Bourdon spring receives clamping screws 37 which pass through the arcuate slot of a calibrating arm 38. The arcuate slot has its center of curvature approximately at the center of the Bourdon spring. The free end portion of the calibrating arm 38 is adjustably extensible and is provided with a pivot pin 40 on which there is mounted one end of a link 9. This link has a number of variously spaced holes through each of its end portions (Fig. 8) and is connected with the operating means of a pen arm and baffle assembly unit, the connection of the link thereto being hereinafter described.

This pen arm and baffle assembly unit comprises the rear plate 43 (Fig. 4) attached to the rear wall of the instrument and a front plate 44 held in spaced parallel relation to the rear plate by the pillars 45. These front and rear plates are provided with pivot pins 46 and 47, which rotatably support the free ends of the arms 49 and 50 of a U-shaped pen arm bracket 51. The bracket 51 is provided with extensions 52 and 52a radiating therefrom in the region of the pivot pin 46. It should be pointed out that the two extensions 52 and 52a on the pen arm bracket are provided so that when the Bourdon spring is located at the right of the unit as in Fig. 1, the link will be connected to the extension 52a. However, when the Bourdon spring is located at the left of the unit, the link 9 is connected to the extension 52. The extension 52 is provided with a forwardly extending pin 53 and the extension 52a is similarly, provided with a forwardly extending pin 53a. Either of these pins may serve as actuating means for the baffle 11, as will be hereinafter described. The free ends of the extension 52 and 52a also have a series of pivots 55 and 55a (Fig. 8) located in rows inclined to the principal axis of arm 49. In the arrangement shown, the upper end of the link 9 may be connected to any one of the pivots 55a, being retained thereon by any suitable means, such as a spring clip.

It will be understood that the inclined row of pivots, 55a, the groups of holes in the end portions of link 9, the rotatable arm 38, and the slidable Bourdon spring mounting block 34 are provided so that the proper angular relation of the linkage between Bourdon spring and pen arm can be established. This proper linkage relation insures that temperature changes at bulb 5 are accurately recorded on the chart.

The arm 50 of the pen arm bracket has secured on the front face thereof, as best illustrated in Fig. 2, a pen arm assembly. This assembly includes a mounting strip 56 secured to the bracket by screws 57. This mounting strip has pivotally supported thereon at 58, the pen arm 59, which terminates at its lower or free end in a pen or stylus 60 to mark on a chart 61. In calibrating the instrument it is sometimes necessary to adjust the pen arm 59 with respect to its mounting strip 56 on which it is rotatably mounted. To effect this adjustment, there is provided an adjusting screw 62 respectively engaging a threaded lug on the pen arm and an apertured lug on the free end of the mounting strip. Thus by turning the adjusting screw, the angular relation between the pen arm 59 and its mounting strip 56 can be adjusted at will. Since the instrument, as herein illustrated, also serves as a recording device, the chart 61 is rotated in accordance with the passage of time. The chart-rotating means is of conventional construction and it need only be stated that the chart is mounted on a chart hub 64 which is rotated by a suitable clock motor M.

Figures 3, 4, 4A, 5:
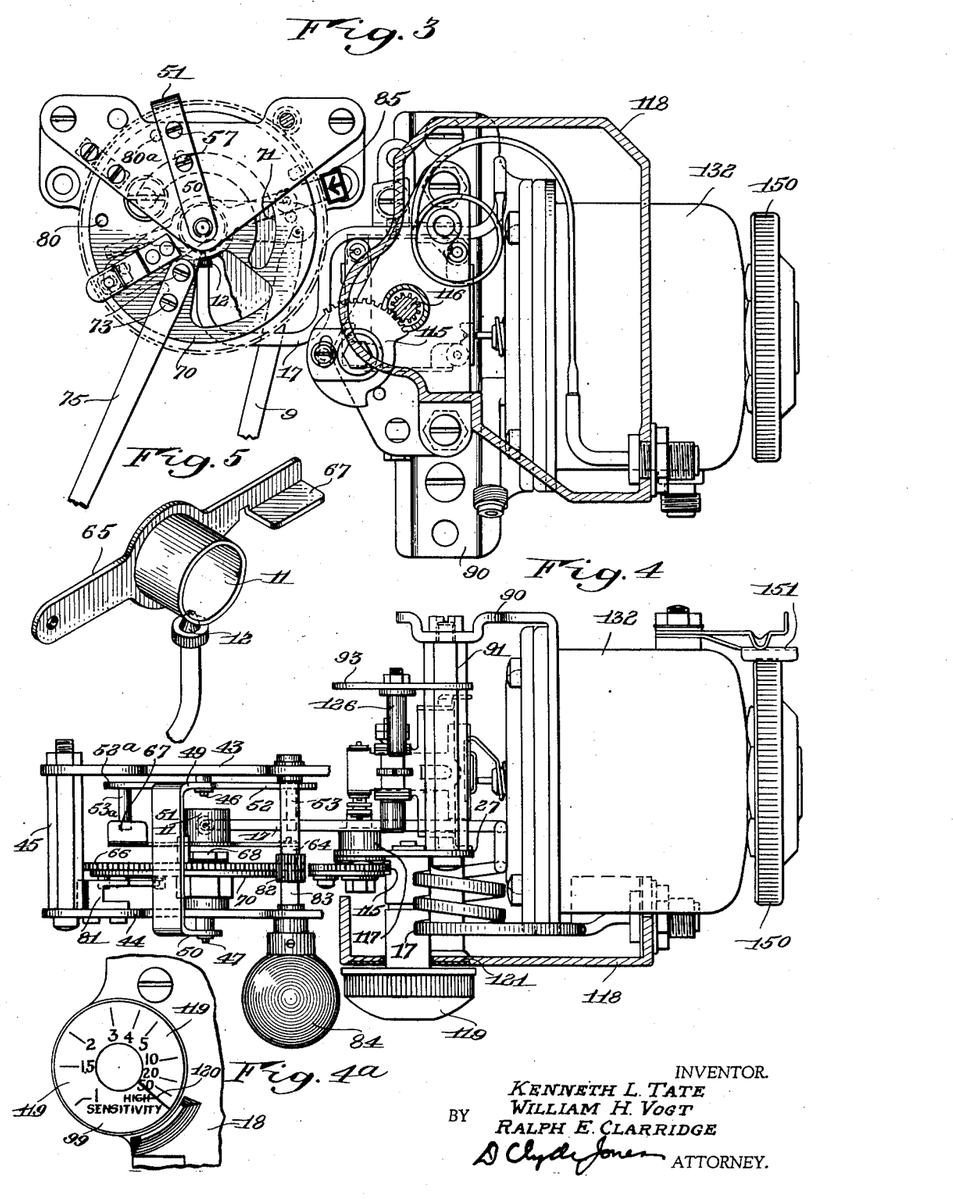
Fig. 3 is a fragmentary front view and Fig. 4 is a plan view of a pen arm and baffle assembly unit, as well as a follow-up unit cooperating therewith comprising a part of the instrument of Fig. 2.
Fig. 4A is a fragmentary detail view of a graduated scale and a cooperating adjusting knob forming a part of the follow-up unit.
Fig. 5 is a perspective view of the baffle arm and baffle in cooperative relation to the nozzle.

The regulator of this invention, as previously described, is of the pneumatically operated type and is provided with a baffle 11 to control the escape of compressed air from the nozzle 12 and thereby operate a relay air valve 20 which, in turn, controls the application of compressed air to operate the diaphragm motor of valve V to effect the desired regulation. In accordance with the present invention, the baffle 11 is in the form of a hollow cylinder (Fig. 5) having its principal axis perpendicular to the jet of fluid escaping from the apertured surface of the nozzle 12 with which surface the outer surface of the baffle cooperates. Since the outer surface of the baffle is endless or cylindrical, the apertured surface of the nozzle will always be parallel to a tangent to said baffle surface under normal operating conditions. This arrangement enables the baffle to throttle the pressure fluid escaping from the nozzle, for all set-point adjustments of the baffle whereas in the case of a flat baffle, the pressure fluid escaping from the nozzle can be sufficiently throttled by the baffle only when the baffle is very nearly parallel to the apertured surface of the nozzle. In order to achieve this parallel relation with a flat type baffle adjustable to various set points, an objectionable differential lever arrangement must be utilized. The cylindrical baffle 11 is fastened to and projects at right angles from an intermediate point on one surface of the baffle arm 65. The left end of this arm as viewed in Fig. 4, is pivotally mounted at 64 on the rear face of the set pointer gear 66, while the right or free end of the baffle arm is provided with an angular extension 67 projecting in the path of the pin 53a, carried on the extension 52a of the pen arm bracket. The set pointer gear 66 is rotatably mounted on a stub shaft 68 in axial alinement with the pivot pins 46 and 47 of the pen arm bracket 51. It should be mentioned that the baffle arm 65, which is pivoted at 64 swings the principal axis of the baffle 11 in an arcuate path intersecting the axis defined by the pivot pins 46 and 47. There is also rotatably mounted on the stub shaft 68, a disc 70 of slightly smaller diameter than that of the set pointer gear 66. The gear 66 and the disc 70 have their two inner surfaces in frictional engagement, the disc 70 having an arcuate slot 71 therein which receives a stud 72 threaded into the face of the gear 66. This slot and stud determine the range of movement of the gear 66 with respect to the disc 70. The head of the stud 72 engages the margin of the exposed face of the disc 70 at the slot 71 so that the gear and the disc are frictionally held in engagement, the tightness of this engagement being determined by the adjustment of the stud 72. The disc 70 has secured to the front face thereof by screws 73, a set pointer arm 75. It will be noted in Fig. 2 that the free end of this pointer cooperates with the graduations on the chart to indicate the temperature at which the instrument will control. For example, in Fig. 2 the set pointer arm 75 is positioned at the 300° F. graduation, which means that the instrument will function to maintain a temperature of 300° F. at the bulb 5. Although the disc 70 and the gear 66 tend to rotate as a unit due to the friction therebetween, this gear and disc are releasably latched together. For this purpose, the disc 70 has a latch 76 (Fig. 10) which is mounted on a leaf spring 77, carried by this disc. This latch includes a rectangular part to fit the notch 78 in the disc 70 (Fig. 12) and a cylindrical portion to fit either of the holes 79 and 79a (Fig. 11) in the gear 66. The disc has two spaced stops 80 and 80a which respectively engage a lug 81 mounted on the front plate 44 Fig. 7. It should be understood that when the disc 70 is secured to the gear 66 by the latch 76 engaging one of the holes 79 therein, the gear and disc will rotate as a unit between the limits determined by the engagement of stops 80 and 80a with lug 81, to change the angular position of the set pointer 75 with respect to the chart 61. Also as the gear 66 is rotated, it raises or lowers, as the case may be, the pivot pin 64 on which the baffle arm 65 is rotatably supported. This changes the relation of the baffle 11 to the nozzle 12 and establishes an adjustment whereby the instrument will effect its control at a different temperature, namely the set point temperature indicated by the new setting of the set pointer 75. The rotation of the gear 66, for effecting this result, is caused by a pinion 82 meshing with this gear. This pinion is carried by the shaft 83 journaled in the front and rear plates 44 and 43. Shaft 83 projects through plate 44 to terminate in an adjusting knob 84.

Figures 6, 7, 8, 9, 10, 11, 12, 18, 19:
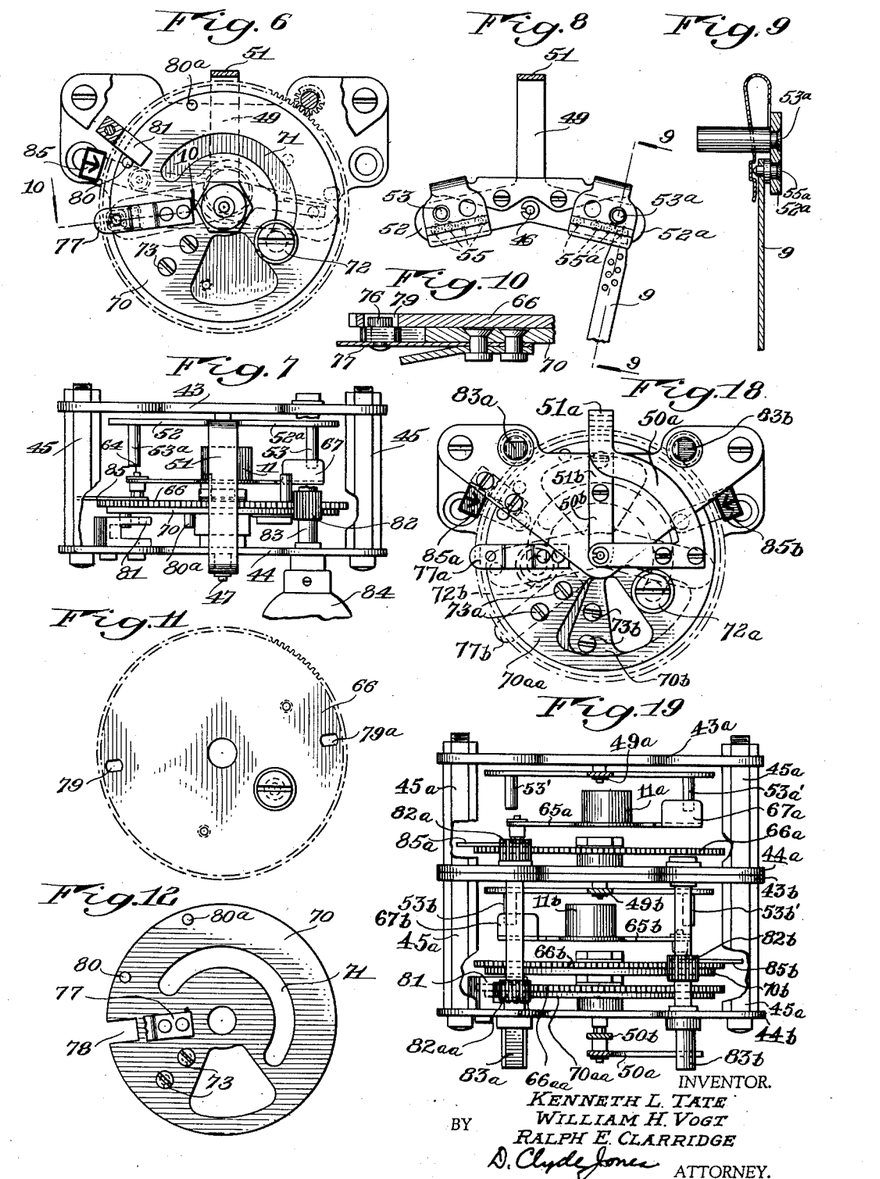

In order to satisfy operating requirements, it has been necessary to have one type of regulator in which the output pressure thereof, such as in conduit 21, increased with a temperature increase at bulb 5 and another type of regulator in which the output pressure thereof decreased as the temperature at bulb 5 increased. The first-mentioned type is conveniently referred to as a "direct-acting regulator" and the second as a "reverse-acting regulator." While it has been possible in the past, to change a direct-acting regulator into a reverse-acting regulator and vice versa, such a change has required a partial disassembly of the device and rearrangement of its parts. The regulator of the present invention, however, can be quickly changed by a simple manual adjustment from one type of regulator to the other. This adjustment is effected in the pen arm and baffle assembly unit. This unit as illustrated in Figs. 1, 3 and 4, provides direct action but as illustrated in Figs. 6 and 7 provides reverse action. In order to change the adjustment of this unit from direct action to reverse action, the knob 84 is turned in a counterclockwise direction. The knob thus turns the pinion 82 which rotates the gear 66 and the disc 70 as a unit in a clockwise direction until the stop 80 engages the lug 81. Then the operator disengages the latch 76 from the hole 79 in gear 66 by lifting tab 77 and continues to rotate the knob in the counterclockwise direction. However at this time the disc 70 is now held stationary by the engagement of the stop 80 with the lug 81, but the gear 66 continues to rotate in the clockwise direction until the latch 76 engages the hole 79a in the gear. Gear 66 and plate 70 are now fastened together as a unit so that the rotation of the knob 84 is again effective to rotate the set pointer 75 to a new control temperature on the chart. It will be noted that the pivot 64 of the baffle arm 65, prior to the adjustment was at the right of the nozzle 12 (Figs. 3 and 4) to effect the direct action type of regulation. However, as a result of the mentioned adjustment, the gear 66 has rotated the pivot 64 of the baffle 65 to a point at the left of the nozzle 12 (Figs. 6 and 7). In this last-mentioned position of the pivot 64, the extension 67 on the baffle arm 65 engages the pin 53 on the extension 52 of pen arm bracket 51. With the unit adjusted as in Figs. 3 and 4, a temperature increase causes pin 53a to move the baffle 11 away from the nozzle with the result that relay valve 20 opens to increase the output pressure in conduit 21. However, when the unit is adjusted as in Figs. 6 and 7, a temperature increase causes the pin 53 to permit the baffle 11 to move by gravity toward the nozzle 12. This results in the closing of relay valve 20 with a consequent decrease of pressure in conduit 21. For convenience in adjustment there is secured to the gear 66 a target 85 provided with an arrow. This arrow in both positions of adjustment of the gear 66, points in the direction that the pen arm 75 must move (that is a rise or fall in temperature) to give an increased output pressure in conduit 21.

Figure 13:
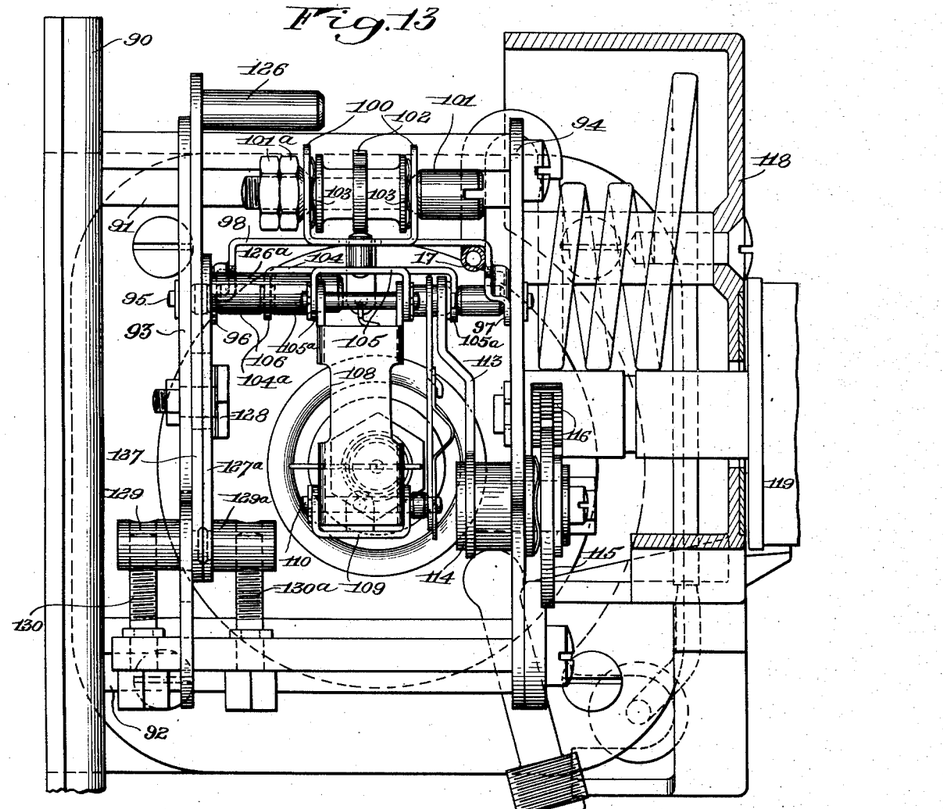
Fig. 13 is an end view of the follow-up unit and Figs. 14 and 15 are simplified front views of this unit in different positions of adjustment.
Figure 14:
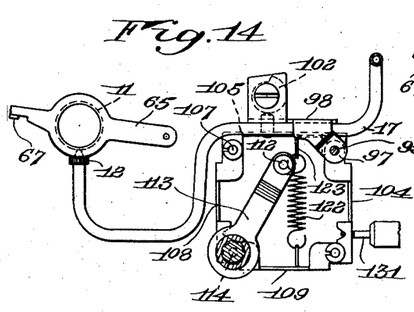
Figure 15:
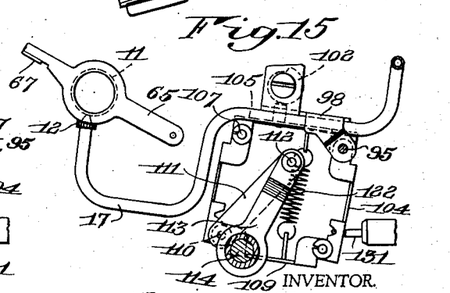

The nozzle 12 which cooperates with the baffle, is a part of the nozzle-mounting and follow-up unit, best illustrated in Figs. 13, 14 and 15. This unit comprises a bracket 90 secured to the rear wall of the instrument, on which bracket, there are mounted in spaced relation on the pillars 91 and 92, the rear plate 93 and the front plate 94. These plates have alined openings in which there is mounted the shaft 95. This shaft passes through and rotatably supports the down-turned ears 96 and 97 of a U-shaped bracket 98. The nozzle pipe 17 which carries the nozzle 12, is soldered or otherwise secured to this bracket as best shown in Fig. 15. Thus the nozzle and the bracket 98 rotate about the shaft 95 as an axis, the nozzle pipe 17 having a coiled portion therein (Fig. 4) to facilitate flexing. The bracket 98 is provided with a pair of upwardly extending arms 100 having alined openings therein to receive a screw 101 on which a cam 102 is fixed. The screw 101 is retained by lock nuts 101a and suitable spring washers 103 frictionally hold the cam in any position to which the screw has been adjusted by means of a screw driver engaging the kerf in the screw head. The cam 102, the contour of which will best be seen in dotted showing in Fig. 14, determines the zero setting of the nozzle 12 with respect to baffle 11.

The shaft 95 also rotatably supports one end of each of the links 104 and 105, these links being provided respectively with ears 104a and with ears 105a which are perforated to receive this shaft. Suitable spacer sleeves, such as 106, serve to space the ears of the respective links. The free end of the link 105 has pivoted thereto at 107 a link 108, while the link 104 has pivoted to its free end, a link 109. The remaining ends of the links 108 and 109 are pivotally connected together by the pivot pin 110. It will be understood that the links 104, 105, 108 and 109 are of equal lengths so that they provide a parallelogram linkage L movable about the fixed shaft 95 to change the position of the nozzle 12. The pivot pin 110 of links 108 and 109, is connected by a link 111 to the pivot pin 112 on the free end of a crank arm 113. This crank arm, which is of the same length as the link 111 and the parallelogram links, has its other end mounted on a rotatable shaft 114 journaled in the front plate 94. Link 111 is thus arranged to swing about the pivot pin 112 as a center and consequently limits the pivot pin 110 to a certain arc of movement for any given adjustment of the crank arm 113. Since the movement of the pivot pin 110 is thus determined, the possible movement of the parallelogram linkage about the shaft 95 for any given adjustment will likewise be determined. It will be appreciated that this adjustment of the linkage varies the amount of movement between the link 104 and 105. When the pivot pin 112 is adjusted into alignment with the pivot 107, movement of link 104 will cause no movement of link 105. With the pivot pin 112 adjusted to the right of pin 107, as viewed in Fig. 15 a movement of the link 104 toward the left will result in an upward movement of link 105. As the pivot pin 112 is moved toward the right, the amount of the upward movement of the link 105, for a given leftwise movement of link 104 increases, although always less than that of link 104 until shaft 95, stub-shaft 114 and pivot pin 112 are in line. Then a movement of link 104 causes an equal movement of link 105. As the pivot pin 112 is adjusted to the right beyond this position, a given movement of link 104 toward the left will result in a greater movement of link 105. When the pivot pin is adjusted to the left of pivot 107, a movement of the link 104 toward the left results in a downward movement of the link 105. Thus the linkage is in effect a motion translator which can function as an amplifier or reducer of motion and can also transfer motions therethru in a negative ratio. The shaft 114 has secured thereto, a segment gear 115 which meshes with a pinion 116 (see Figs. 3 and 4) on the shaft 117. This shaft is rotatably supported in the front plate 94 and its forward end projects through a cover plate 118 where it is provided with a transparent adjusting knob 119. This knob has thereon a reference line 120 (Fig. 4a) and is rotatable with respect to a graduated scale 121 on the cover plate 118 (Fig. 4) to indicate the various positions of adjustment, determining the possible paths of movement of the parallelogram linkage. A tension spring 122 (Fig. 16) has its ends respectively connected to the link 109 and to an ear 123 on the bracket 98. Thus the spring 122 urges the bracket 98 in a direction so that the cam 101 carried thereby always engages the pin 124 carried by the link 105. Spring 122 also takes up substantially all of the lost motion in the parallelogram linkage.

It will be noted that the upward travel of the parallelogram linkage may be limited by an adjusting stop including the pin 126 which projects into the path of one of the ears 100 extending upward from the bracket 98. The pin 126 is carried on a bar 127 having a vertical slot therein to receive the guiding bolt 128 mounted in the rear plate 93. The lower end of bar 127 carries at its lower end, a lug 129 with a threaded aperture therein. This aperture receives a threaded adjusting screw 130 carried by a fixed part of the follow-up unit. It will be appreciated that when the screw 130 is turned in one direction or the other, the bar 127 and the pin 126 will be respectively raised or lowered to limit the upward travel of the parallelogram linkage. Likewise, the downward travel of the parallelogram linkage may also be limited by an adjustable stop 126a which projects across the path of the link 105. The parts of the specific mounting of the stop 126a have been designated by the same reference characters as the corresponding parts of the mounting of stop 126 with the addition of the suffix $a$. Since these mountings are similar a description of one will suffice for the other.

It should be pointed out that when the movement of the parallelogram linkage L is limited in either direction by stops 126 or 126a, the sensitivity reduction mechanism does not function and the regulator will then function as if it were a high sensitivity instrument, until the linkage is no longer restrained by stops 126 and 126a. The need for such stops is principally encountered when the instrument is used as an averaging liquid level controller.

Figures 16, 17:
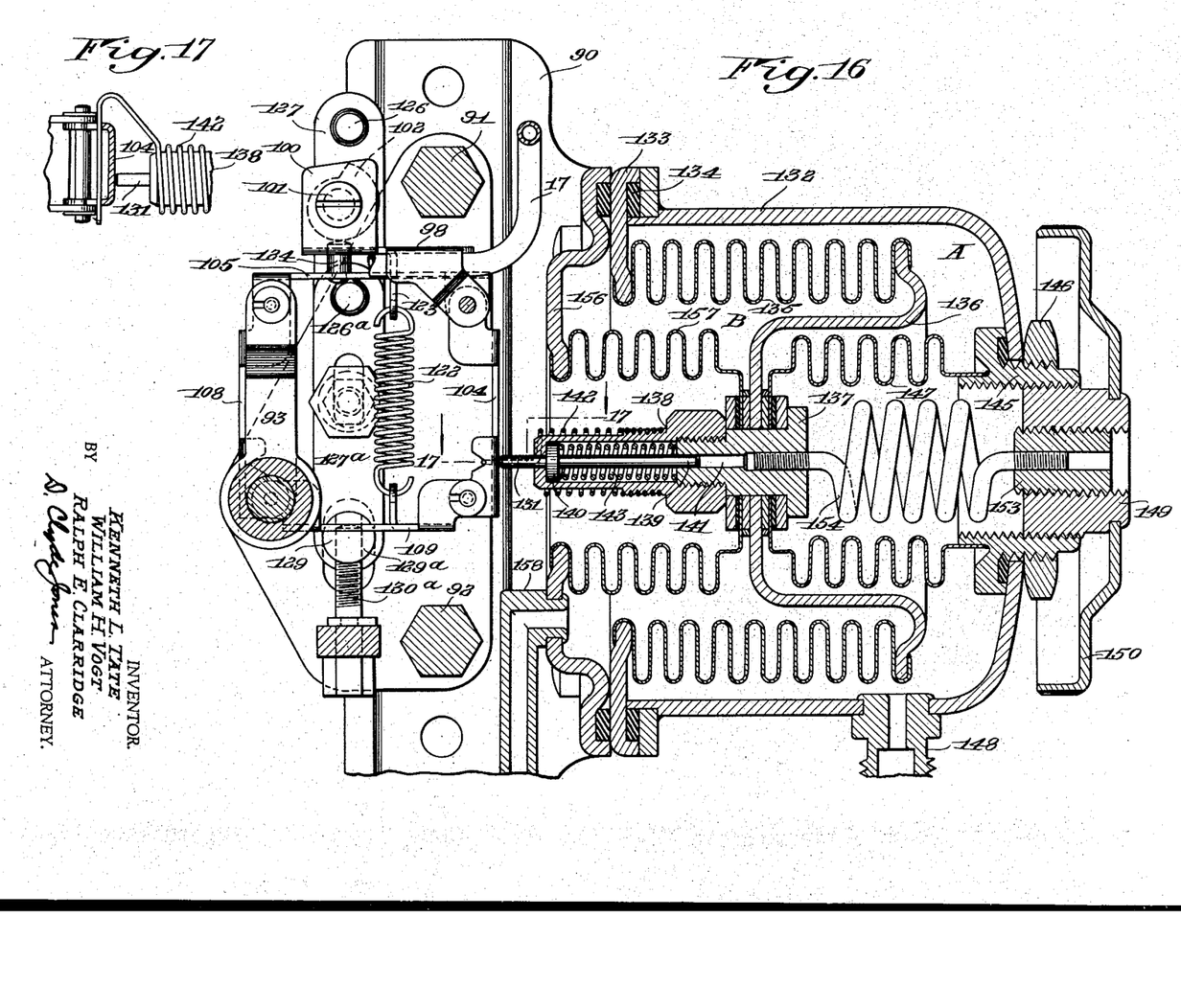
Fig. 16 is a lengthwise section through the follow-up unit and Fig. 17 is a detail, showing the connection between the follow-up unit and the parallelogram linkage.

The input motion is introduced into the parallelogram linkage L by a plunger extension rod 131 which contacts the parallelogram link 104. The extension 131 is carried by and is actuated by a pneumatic follow-up unit. This unit includes a rigid bellows housing 132 which is integral with the bracket 90 (Fig. 16). The outer margin of an annular plate 133 is sealed to the left-end of the housing by a gasket 134, while the inner margin of the plate has sealed thereto, one end of a metal bellows 135 herein referred to as the main bellows. The other end of the bellows 135 is sealed to the rim of a cup 136. This cup has a central opening to receive a plunger housing nut 137 which is screwed into the end of a hollow plunger housing 138. The plunger housing contains a plunger 139 provided near one end thereof with a spring seat or disc 140 engaging the inner wall of the housing as a guide. The right end portion of the plunger is received in a bore 141 in the plunger housing nut 137 and is guided thereby, while the left end of the plunger projects through the end of the housing as the rod 131 to contact the link 104. A coil spring 142 having one end portion attached to the exterior of the plunger housing 138 and having its other end portion hooked over link 104 (Fig. 17), resiliently holds the end of the rod 131 in engagement with the adjacent surface of link 104. A second coil spring 143 having one end contacting the plunger nut and the other end contacting a face of the plunger disc 140 normally maintains the plunger in the position shown in Fig. 16.

The bellows housing 132 has an opening therein in alinement with the principal axis of the plunger 139. This opening receives a bushing 145 which is sealed to the housing by a gasket and by a clamping nut 146. The bushing 145 has one end of a sealing bellows 147 soldered thereto, the other end of the bellows being sealed around the opening in the bottom of the cup 136 by a gasket and by a nut 137. It should be noted that the housing 132, the bellows 135 and the cup 136, as well as the sealing bellows 147, define the previously mentioned expansible air chamber A to which compressed air is supplied as previously described through a nipple 148 mounted in the wall of the housing 132 and connected to conduit 23. The bushing 148 is internally threaded for engagement with external threads on a plug 149 provided with a hand wheel 150 by which the plug can be rotated. The down turned edges of a leaf spring 151 (Fig. 4), engage the knurled periphery of the wheel to releasably retain it in any given position of adjustment. The plug 149 is internally threaded with threads of the opposite hand from its external threads to receive an externally threaded unit 153. A bellows tensioning spring 154 has its left end (Fig. 16) anchored in the end of the nut 137 as by screw-threaded engagement, while the right end of this spring is anchored in one end of the nut 153. Since the internal threads and the external threads on the plug 149 are of opposite hand, the spring 154 will respectively increase and decrease its tension on the main bellows 113 when the hand wheel 150 is rotated in one direction or the other. A second annular plate 156 of like diameter with plate 133 has its inner margin extending beyond the inner margin of plate 133. The inner margin of plate 156 has sealed thereto one end of a bellows 157 of the same diameter as the sealing bellows 124 and arranged coaxially therewith. The other end of the bellows 157 is sealed to the bottom of the cup 136 by a suitable gasket and washers clamped in position by the plunger housing 138 and nut 137. The space between the main bellows 113 and the bellows 157 constitutes a closed chamber B into which compressed air is admitted through conduit 158 connected to conduit 29 (Fig. 1).

In many processes it is desirable to control and record two different conditions. While of course this can be accomplished by using two instruments like that shown in Fig. 2, it is desirable to use a multiple pen recording controller. Such a controller duplicates the parts illustrated in Fig. 1 and Fig. 2 except that instead of providing two independent pen arm and baffle assembly units, a single composite pen arm and baffle assembly unit, as shown in Figs. 18 and 19, is utilized. This composite unit permits two records to be made on a single chart and, in addition, conserves space in the single case which houses the two controller mechanisms, as well as permitting the parts to be conveniently located for easy adjustment.

In this description certain of the parts of the composite unit are identified by the same reference characters with added suffixes a and b, as were used in the previously described unit. This unit comprises a rear plate 43a, plates 44a and 43b serving as an intermediate support, and a front plate 44b, all held in parallel relation by the pillars 45a. The plates 44a and 44b are provided with rearwardly extending alined stub-shafts on which there are mounted the set point gears 66a and 66b respectively. The gear 66a has pivotally mounted thereon the baffle arm 65a with its baffle 11a while the gear 66b has mounted thereon the baffle arm 65b with its baffle 11b, all arranged in the manner previously described in connection with the single unit. The plates 43a and 43b and 44b have pivot pins in alinement with the mentioned stub shafts. The pivot pins on the plates 43a and 44b rotatably support the arms 49a and 50a of a pen arm bracket 51a while the similar pins on plates 43b and 44b rotatably support the arms 49b and 50b of a second pen arm bracket 51b. Each bracket supports a pen arm (not shown) similar to pen arm 50 (Fig. 1) which pen arms make independent records on a single chart 61. It will be understood that the pen arm bracket 51b is so designed that it will swing within the bracket 51.

The forwardly projecting pins 53' and 53a' on bracket arm 49a extend into the possible paths of movement of the extension 67a on baffle arm 65a. Similarly the pins 53b and 53b' on bracket 49b extend into the possible path of movement of the extension 67b on baffle arm 65b.

As in the case of the single unit previously described, the composite unit is arranged so that each set pointer, similar to pointer 75 (Fig. 2) is independently adjustable and each portion of the composite unit can be changed from direct action to reverse action or conversely, by a simple rotary adjustment. To this end, disc 70b to which a set pointer (not shown) is attached by screws 73b, is rotatably mounted on the same shaft as gear 66b, being releasably latched to this gear by the latch 77b. A stub shaft 83b, which carries a pinion 82b in mesh with set point gear 66b, serves to rotate gear 66b for the purposes previously set forth.

It is also necessary to effect a similar adjustment of set point gear 66a. However, for convenience in adjusting this gear, there is rotatably mounted on the shaft supporting gear 66b and disc 70b, a gear 66aa and disc 70aa normally latched together by latch 77a. Disc 70aa has a set pointer (not shown) mounted thereon by means of screws 73a. A rotatable shaft 83a is provided with pinions 82a and 82aa which mesh with gears 66a and 66aa to effect rotation thereof. Each of the portions of the composite unit are readily adjustable in the same manner as the single unit, since the adjusting shaft 83 and 83b terminate in conveniently located knobs (not shown) identical with knob 84 (Fig. 7).

The needle valves 25 and 28 are preferably of the construction shown in Tate et al. Patent No. 2,230,093, granted January 28, 1941.

It has been mentioned that the instrument has been disclosed in its most complete form, that is it incorporates pre-act and automatic reset. If it is desired to have automatic reset without pre-act, the valve 25 can be opened wide or the instrument can be assembled without the capacity 24 and needle valve 25, conduit 23 being then connected directly to conduit 26.

If it is desired to provide an instrument having only adjustable sensitivity then the capacity 27 and needle valve 28 as well the chamber B and the connection to conduit 21 are omitted. In this instance the follow up unit will be assembled without annular plate 156 and bellows 157 (Fig. 16). This form of the instrument can be provided with or without pre-act. When pre-act is provided the capacity 24 and needle valve 25 are necessarily connected as shown. When pre-act is not necessary this capacity and needle valve are omitted or the valve 25 is opened wide.

Where a simple, fixed, high sensitivity instrument is desired, the parallelogram linkage L, chambers A and B, as well as capacity 24 with needle valve 25 and capacity 27 with needle valve 28 are omitted. The conduits such as 23 and 26 communicating with these parts, are also omitted. In other words, the nozzle pipe 17 with its nozzle 12 are mounted on a simple bracket to replace the follow-up unit herein illustrated.

We claim:
1. In a pressure operated controller of the type in which a controlling action is effected in re- sponse to the varying back pressure of a pressure fluid supplied through a restricting orifice to a bleed port and escaping therethrough as a jet in amounts corresponding to changes in the condition being controlled by said controller, a nozzle serving as said bleed port for the jet of escaping fluid, a baffle having a circular surface forming several face portions for selected coaction with said nozzle so mounted as to bodily move any one of said selected face portions toward and away from said nozzle to vary the amount of fluid escaping therethrough, means for selecting any of said face portions, as desired, so arranged that the tangent to the surface portion so selected extends at substantially right angles to the main direction of escape of said jet.

2. In a pressure operated controller of the type in which a controlling action is effected in response to the varying back pressure of a pressure fluid supplied through a restricting orifice to a bleed port and escaping therethrough as a jet in amounts corresponding to changes in the condition being controlled by said controller, a nozzle serving as said bleed port for the jet of escaping fluid, a baffle arm mounted on a bodily adjustable pivot to swing in any one of several arcs located in a common plane, said baffle arm being provided with a baffle having a cylindrical surface with the principal axis thereof perpendicular to said plane, various effective portions of the surface being movable toward and away from said nozzle to vary the amount of pressure fluid escaping therethrough, and means for selectively adjusting said effective surface portions to a position wherein the tangent to each mentioned portion thereof extends at substantially right angles to the main direction of escape of said jet.

3. In a pressure operated controller of the type in which a controlling action is effected in response to the varying back pressure of a pressure fluid supplied through a restricting orifice to a bleed port and escaping therethrough as a jet in amounts corresponding to changes in the condition being controlled by said controller, a nozzle serving as said bleed port for the jet of escaping fluid, a baffle arm mounted on a pivot to swing in any one of several arcs located in a common plane, said pivot being mounted for adjustment in the arc of a circle, said baffle arm being provided with a baffle having a cylindrical surface with the principal axis thereof perpendicular to said plane, the center of said circle being located approximately on an extension of said axis when the baffle is in a predetermined position, various effective portions of the surface being movable toward and away from said nozzle to vary the amount of pressure fluid escaping therethrough, whereby the tangent to each mentioned effective portion thereof extends at substantially right angles to the main direction of escape of said jet.

4. In a pressure fluid operated controller, a nozzle adapted to have a jet of pressure fluid issue therefrom, a member movable about a given axis in accordance with a varying condition, said member having stops projecting therefrom at opposite sides of said axis, an arm mounted on a pivot eccentric with respect to said axis, said arm being provided with a baffle circular in cross section to vary the amount of pressure fluid issuing as said jet, said baffle having its principal axis movable into substantial alinement with said axis, a portion of said arm remote from said pivot engaging one of said stops, and means for rotating said pivot about said axis whereby said portion of said arm can be positioned to cooperate with either of said stops.

5. In combination, in a pressure fluid operated controller, a U-shaped bracket having spaced arms pivoted on a common axis, one of said bracket arms being adapted to serve as a pen support, actuating means responsive to a varying condition, said means being connected to said other bracket arm, a pair of stops mounted on one of said bracket arms at opposite sides of said axis, a member rotatable between said arms about said axis, a lever pivoted on said member eccentrically of said axis, a baffle generally circular in cross section mounted on said lever in a position to have the principal axis of the baffle movable into registry with said first axis, said lever having a part engageable with either of said stops depending on the position of said rotatable member, and a nozzle from which a jet of pressure fluid is adapted to escape as varied by the relative approach and recession of the preiphery of said baffle and said nozzle whereby said jet issues in a direction generally normal to a tangent to the effective portion of the cylindrical surface of said baffle.

6. In combination, in a pressure fluid operated controller, a U-shaped bracket having spaced parallel arms pivoted on a common axis, one of said bracket arms being adapted to serve as a pen support, actuating means responsive to a varying condition, said means being connected to said other bracket arm, a pair of stops mounted on one of said bracket arms at opposite sides of said axis, a member rotatable between said arms about said axis, a lever pivoted on said member eccentrically of said axis, a cylindrical baffle mounted on said lever in a position to have the principal axis of the baffle movable into substantial registry with said first axis, said lever having a part engageable with either of said stops depending on the position of said arm, a second member mounted for limited rotation about said first axis between said arms, means for determining the limits of rotation of said second member, an index operated by said second member, means for releasable latching said members together, and a nozzle from which a jet of pressure fluid is adapted to escape dependent on the relative spacing between said baffle and said nozzle, said baffle being cylindrical whereby a tangent to its surface at the point of impact of said jet extends generally at right angles to the main direction of escape of said jet.

7. In a pressure operated controller of the type in which a controlling action is effected in response to the varying back pressure of a pressure fluid supplied through a restricting orifice to a bleed port and escaping therethrough as a jet in amounts corresponding to changes in the condition being controlled by said controller, a nozzle element serving as said bleed port for the jet of escaping fluid, a baffle element having various curved surface portions, each surface portion when in its effective position being capable of varying the amount of pressure fluid ecsaping through the nozzle as the spacing between said baffle and nozzle elements is changed, means for bodily moving one of said elements to change the spacing therebetween, and means for moving any one of said curved surface portions as desired into its effective position wherein the tangent to said last mentioned surface portion extends at substantially right angles to the main direction of escape of said jet.

8. In a pressure operated controller of the type in which a controlling action is effected in response to the varying back pressure of a pressure fluid supplied through a restricting orifice to a bleed port and escaping therethrough as a jet in amounts corresponding to changes in the condition being controlled by said controller, a nozzle element serving as said bleed port for the jet of escaping fluid, a baffle element having various curved surface portions, each surface portion when in its effective position being capable of varying the amount of pressure fluid escaping through the nozzle as the spacing between said baffle and nozzle elements is changed, means for bodily moving said baffle element with respect to said nozzle element in response to changes in the condition being controlled, and means for moving any one of said curved surface portions as desired into its effective position wherein the tangent to said last mentioned surface portion extends at substantially right angles to the main direction of escape of said jet.

KENNETH L. TATE.
WILLIAM H. VOGT.
RALPH E. CLARRIDGE.